Sept. 24, 1968   A. R. NORDEN   3,403,218
MOUNTING MEANS FOR WIRING DEVICES
Filed July 28, 1967

INVENTOR
ALEXANDER R. NORDEN
BY Daly + Daly
ATTORNEYS

United States Patent Office 3,403,218
Patented Sept. 24, 1968

3,403,218
MOUNTING MEANS FOR WIRING DEVICES
Alexander R. Norden, New York, N.Y., assignor to Slater Electric Inc., Glen Cove, N.Y., a corporation of New York
Filed July 28, 1967, Ser. No. 656,843
5 Claims. (Cl. 174—53)

ABSTRACT OF THE DISCLOSURE

The present disclosure relates to a mounting means for wiring devices wherein the usual mounting strap is provided with eccentrically mounted screws which are of a lesser diameter than the corresponding threaded openings in the ears of the customary outlet boxes and which screws act as cams and provide for rapid and simple mounting of the wiring devices in outlet boxes. In some instances, a single one of the eccentrically mounted screws may be utilized in combination with a serrated spike at the opposite end of the mounting strap.

---

The mounting means of the present invention is related to the copending applications of Herbert A. Slater, Serial No. 563,792; Herbert A. Slater and Pierre Haskelson, Serial No. 628,622; and William Drapkin, Serial No. 628,703, all assigned to the assignee of this application.

Electrical wiring devices are customarily mounted in outlet boxes and are fixed in position in these outlet boxes by screws which pass through apertures in mounting straps integral with the wiring devices and are threaded into ears provided on the outlet boxes. Since the mounting screws utilized are of relatively fine pitch and two are necessary to affix each wiring device such as a switch or outlet in the outlet box, considerable time is consumed in threading the screw into a position in which the strap is tight against the edge of the outlet box, or the plaster in cases where the outlet box is recessed with respect to the wall surface. The cost of electrical wiring has reached very high levels, and the main portion thereof residing in the labor charges, and it is therefore advantageous to reduce the time necessary for installation of wiring devices as much as is possible.

The present invention accomplishes such a reduction in time of installation, since the threading of screws into threaded apertures is not required, but instead it is merely necessary to rotate a serrated member, which is in appearance a screw but which serves in fact as a cam, through a portion of a revolution in order to lock a wiring device in position in an outlet box.

Objects and features of this invention will appear when the following description is considered in connection with the affixed drawings, in which, FIGURE 1 is a front-elevational view of a wiring device and mounting strip prior to the positioning and capturing of screws or cams in accordance with the present invention therein;

Figure 5:
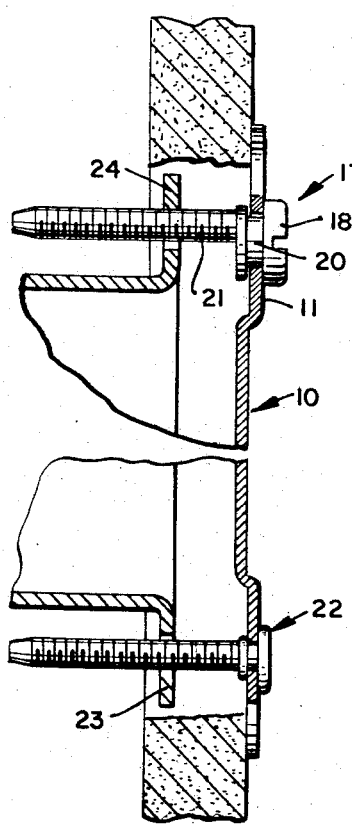
Figure 6:
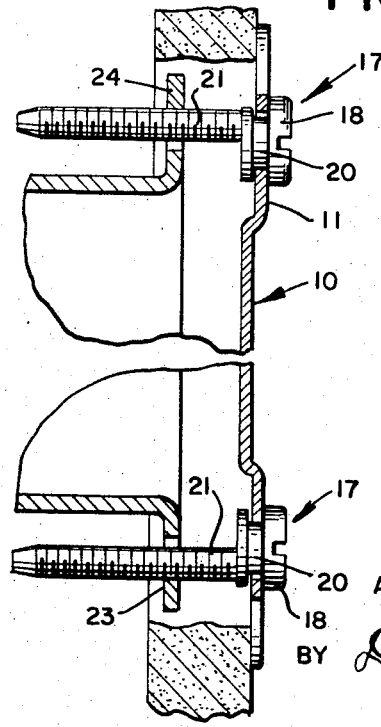

FIGURE 5 is a fragmentary vertical section showing an electrical wiring device mounting strap in accordance with the invention, fixed in position in an outlet box, a single eccentric screw being utilized and the opposite end of the strap being held in position by a spike which is serrated and engages the threads of the opposite outlet box ear; and FIGURE 6 is a view similar to FIGURE 5, but showing the wiring device strap mounted in the wall box through the use of two eccentrically mounted screws.

Referring now to the drawings and particularly to FIGURES 1 through 4, the usual mounting strap is shown at 10, this strap having the mounting ears 11 with the extended portions 12; also, the mounting strap is provided with suitable means such as the bent-off lugs 13 for holding a wiring device in place and suitable aperture for the operating handle of a switch, such aperture being indicated at 14, it being understood that mounting straps vary in accordance with the wiring device with which they are used and of which they are essentially a part.

Figure 1:
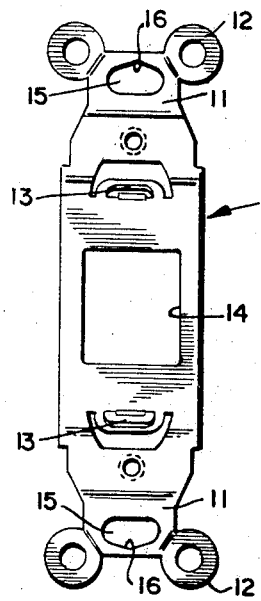
Figure 2:
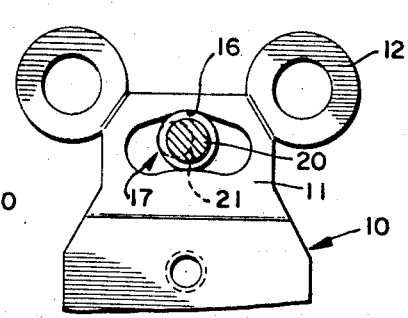
FIGURE 2 is an enlarged view of one end of the strap of FIGURE 1, the view being taken on the plane of the line 2—2 of FIGURE 4.
Figure 4:
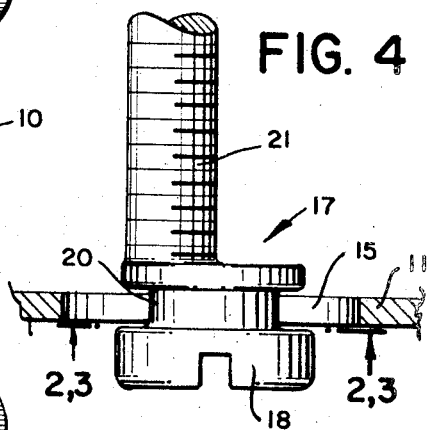
FIGURE 4 is a transverse cross-sectional view of the strap on the plane of line 4—4 of FIGURE 3, showing the mounting of the screw in the strap so that the screw portion thereof is eccentric to the axis of the screw head.
Figure 3:
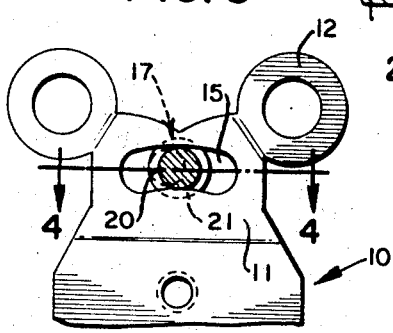
FIGURE 3 is a similar enlarged view showing the strap after a bending operation has been performed to hold the screw captive in the slot of the strap.

In the present instance the usual oval holes 15 are modified to form an outwardly extending generally triangular portion 16 which, after a screw 17 having a head 18 with a concentric groove 20 therein is inserted in the aperture 15, is bent inwardly as shown in FIGURE 3 to form an elongated, preferably arcuate slot or oval aperture in which the screw head 18 is confined, the arcs of the slots being formed on radii struck from the center of the strap. The threaded portion 21 of the screw 17 is of lesser diameter than the head portion 18 and is eccentric with respect to that head portion, as is clearly shown in FIGURE 4.

In mounting the wiring device, the strap is aligned with the outlet box, with the wiring device extending into the outlet box and the portion 21 of the screw or screws inserted into the corresponding aperture of the box ear and thereafter turned to a position in which it bears against the screw threads of the box ear to firmly hold the mounting strap and the integral wiring device in position.

Thus, as seen in FIGURE 5, the spike 22 is inserted in the lower outlet box ear 23 and the upper screw 17, or more exactly, the portion 21 of that screw is inserted in the opening in the upper ear 24 of the box and then, by means of a screwdriver, the head 18 of the screw is rotated so that the screw engages the upper portion of the threads in the box ear 24, forcing the strap 10 downwardly and forcing the lower portion of the threads on spike 22 to engage the lower threads of the aperture in box ear 23.

In FIGURE 6 the mounting means is shown in use in a similar situation wherein the mounting strap is provided with two eccentric screws 17, rather than one screw and one spike 22. In this case the procedure in installing the device is substantially identical, save that in this instance the two screws are passed freely through the openings in the upper and lower box ears 23 and 24 and thereafter adjusted so that they act against each other with the screws engaging along the upper portion of the threaded opening in the upper box ear 24 and the lower portion of the threaded opening in the lower box ear 23.

It will of course be realized that the adjustment of the screws may be such that the engagement of the upper screw is along the lower portion of the upper box ear aperture, and the engagement of the lower screw is along the upper portion of the lower box ear aperture, or in some instances one screw may engage with a portion of a thread in the box ear and the other screw with the corresponding portion of the thread in the other ear.

It will also be recognized that in order to make the operation as simple as is possible, the slots in the screw heads 18 are so oriented that the user does not need to experiment to determine the position of the screw, but can be advised thereof by visually observing the position of the slot.

It will also of course be recognized that although the device has been described in connection with a mounting strap for a switch, mounting straps for other wiring devices such for example as duplex receptacles, pilot lights, and the like, and modified straps for all such devices may be utilized and that furthermore, the mode of mounting may be utilized with devices other than electrical wiring devices.

What is claimed is:

1. A mounting means for wirng devices of the type having a strap to which the wiring device is fixed, the strap being adapted to be affixed to an outlet box with the wiring device within the box, comprising, in combination, at least one aperture in said strap adapted to align with a threaded aperture of the outlet box, a screw having an eccentric head, means mounting said head in the strap for rotation concentrically to the threaded box aperture, and threaded means mounted on said strap and adapted to align with a second threaded aperture of the outlet box, said last mentioned means engaging a portion of the threads of said second threaded box aperture when said screw is rotated to cam the threads thereof into an opposing portion of the threads of the first threaded box aperture.

2. A device as claimed in claim 1 wherein said threaded means comprises a second eccentric headed screw, said screw being mounted in said strap for rotation of said head concentric with the corresponding threaded box aperture.

3. A device as claimed in claim 1 wherein said threaded means comprises a spike having a serrated surface, said spike being fixed to the mounting strap and extending generally perpendicular thereto, said spike having a diameter less than the diameter of the corresponding threaded box aperture.

4. A device as claimed in claim 1 wherein said screw has a diameter less than the diameter of the threaded box aperture.

5. A device as claimed in claim 1 wherein said strap aperture is oval-shaped with the major axis of the oval extending transversely of the strap and wherein said screw head has a peripheral groove therein, the edges of said slot extending into said groove to hold said screw in said strap while permitting adjustability of the strap relative to the outlet box.

References Cited

UNITED STATES PATENTS 1,807,410    5/1931    Hubbard _____ 174—57
3,059,045    10/1962    Swartwood _____ 174—53

LARAMIE E. ASKIN, *Primary Examiner.*

D. A. TONE, *Assistant Examiner.*